(12) United States Patent
Zhang et al.

(10) Patent No.: US 8,090,078 B2
(45) Date of Patent: Jan. 3, 2012

(54) SYSTEMS AND METHODS FOR HALF-DUPLEX SPEAKERPHONES AND OTHER TWO-WAY COMMUNICATION DEVICES

(75) Inventors: Pengfei Zhang, Shanghai (CN); Caogang Yu, Shanghai (CN)

(73) Assignee: Beken Corporation, Shanghai (CN)

( * ) Notice: Subject to any disclaimer, the term of this patent is extended or adjusted under 35 U.S.C. 154(b) by 682 days.

(21) Appl. No.: 12/272,298

(22) Filed: Nov. 17, 2008

(65) Prior Publication Data

US 2010/0119055 A1 May 13, 2010

(30) Foreign Application Priority Data

Nov. 11, 2008 (CN) .......................... 2008 1 0043914

(51) Int. Cl.
*H04M 1/24* (2006.01)

(52) U.S. Cl. .................... 379/3; 379/406.07; 379/406.06
(58) Field of Classification Search .................... 379/24, 379/3, 388.01, 388.06, 390.01, 406.07, 406.06
See application file for complete search history.

(56) References Cited

U.S. PATENT DOCUMENTS

| | | | | |
|---|---|---|---|---|
| 5,579,389 A * | 11/1996 | Wagner et al. | ........... | 379/388.02 |
| 5,592,547 A * | 1/1997 | Wu et al. | ................... | 379/406.07 |
| 5,692,042 A * | 11/1997 | Sacca | ........................ | 379/390.01 |
| 5,768,364 A * | 6/1998 | Karnowski et al. | ....... | 379/388.02 |
| 5,787,165 A * | 7/1998 | Lilja et al. | ................. | 379/406.07 |
| 5,857,019 A * | 1/1999 | Iglehart et al. | ........... | 379/388.06 |
| 6,005,884 A * | 12/1999 | Cook et al. | .................... | 375/132 |
| 2009/0141869 A1 * | 6/2009 | Wang et al. | ................ | 379/27.01 |

* cited by examiner

*Primary Examiner* — Creighton Smith
(74) *Attorney, Agent, or Firm* — Aaron Wininger; Perkins Coie LLP

(57) ABSTRACT

An apparatus to enable half-duplexing capabilities in a two-way communication device is disclosed. The apparatus estimates the signal power and background noise of a first input signal and a second input signal during approximately the same period. The apparatus further provides at least one control signal based on the result of one or more determinations. These determinations may include whether the estimated signal power of at least one of the first and second input signals exceeds a threshold value; whether the estimated signal power of the first input signal exceeds the sum of a first threshold value and the estimated background noise of the first input signal; and whether the estimated signal power of the second input signal exceeds the sum of a second threshold value and the estimated background noise of the second input signal. Other embodiments for use with two-way communication devices and related methods are also disclosed.

20 Claims, 8 Drawing Sheets

SYSTEMS AND METHODS FOR HALF-DUPLEX SPEAKERPHONES AND OTHER TWO-WAY COMMUNICATION DEVICES

CROSS-REFERENCE TO RELATED APPLICATION

This application claims priority to Chinese Patent Application No. 200810043914.0, filed Nov. 11, 2008, the disclosure of which is hereby incorporated by reference in its entirety.

BACKGROUND

Speakerphones allow telephones, including mobile telephones and corded or cordless conventional telephones, to be used hands-free. Speakerphones generally utilize a speaker to project sounds, including dial tones or sounds received from the other end of a telephone call. Speakerphones also utilize a microphone to detect a user's voice or other sounds near the speakerphone so that these sounds may be transmitted.

Since the speaker of a speakerphone is typically located in close proximity to the microphone, it is possible for feedback (e.g., echo, oscillation, etc.) to occur if the microphone picks up and transmits sounds coming from the speaker. Accordingly, speakerphones typically implement either full-duplex or half-duplex functions to prevent feedback. A speakerphone with full-duplex functionality permits a user to simultaneously speak and hear what a caller is saying. To prevent feedback, such full-duplex systems typically filter out the speaker signal from the microphone pickup. In contrast, a half-duplex speakerphone typically prevents feedback by enabling one of the speaker or the microphone at any given time. Other two-way communication devices besides speakerphones, such as walkie-talkies and other radio communication devices, also often implement half-duplex functionality.

Implementing half-duplex functionality into a speakerphone generally includes a half-duplexer component that determines whether to send or receive sounds. Typically, this component is capable of determining whether a dial tone is present on the phone line, whether a caller at the other end of a call is speaking or making other sounds, and whether the user of the speakerphone is speaking or making other sounds into the microphone. Furthermore, this half-duplexer should typically be capable of controlling the signals that are transmitted to the speaker and/or the other end of a telephone call based on these determinations.

DETAILED DESCRIPTION

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. The term "based on" is not exclusive and is equivalent to the term "based, at least in part, on" and includes being based on additional factors, whether or not the additional factors are described herein. Although certain terms may be emphasized below, any terminology intended to be interpreted in any restricted manner will be overtly and specifically defined as such in this Detailed Description section.

Figure 1:
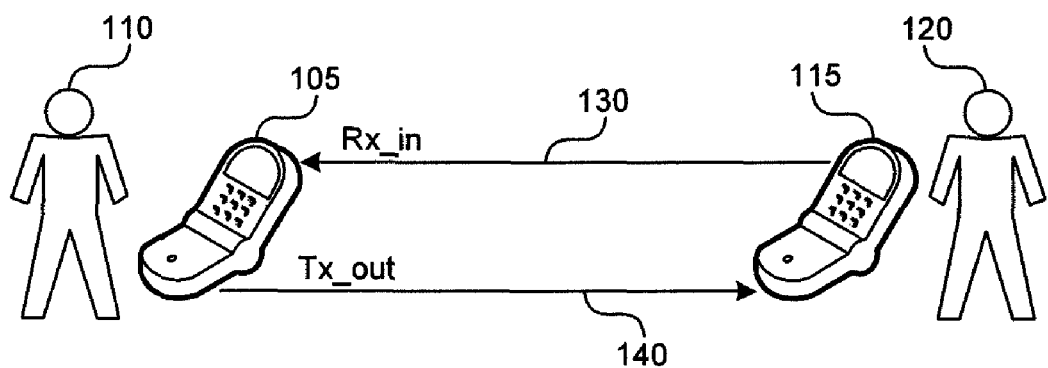
FIG. 1 is a block diagram illustrating a flow of communications to and from a typical speakerphone.

FIG. 1 is a block diagram illustrating a flow of communications to and from a typical speakerphone 105. The speakerphone 105 permits a user 110 to have two-way communications with a remote caller 120 who is using another telephone 115 or similar two-way communications device. During a telephone call to the remote caller 120, the speakerphone 105 may receive an input signal Rx_in over an input connection 130 and transmit an output signal Tx_out over an output connection 140. Typically, the Rx_in signal embodies the speech or other sounds made by the remote caller 120 and/or signals, including dial tones, from intermediaries such as a telephone network like the public switched telephone network (PSTN). The Tx_out signal typically includes the speech or other sounds made by the user 110 of the speakerphone 105 and/or other signals produced by the speakerphone 105, such as dual-tone multi-frequency (DTMF) signaling. In some embodiments, the input connection 130 and output connection 140 might be the same connection, such as a single conventional wired telephone line or a wireless connection to a cellular tower. In other embodiments, the input connection 130 and output connection 140 may be distinct. The speakerphone 105 may also communicate with telephones or other two-way communications devices using other protocols and other types of input/output connections. For example, some speakerphones might utilize a Voice-over-Internet Protocol (VoIP) and communicate over a network connection instead of a telephone line, or communicate over a local intercom system, and/or the like.

Figure 2:
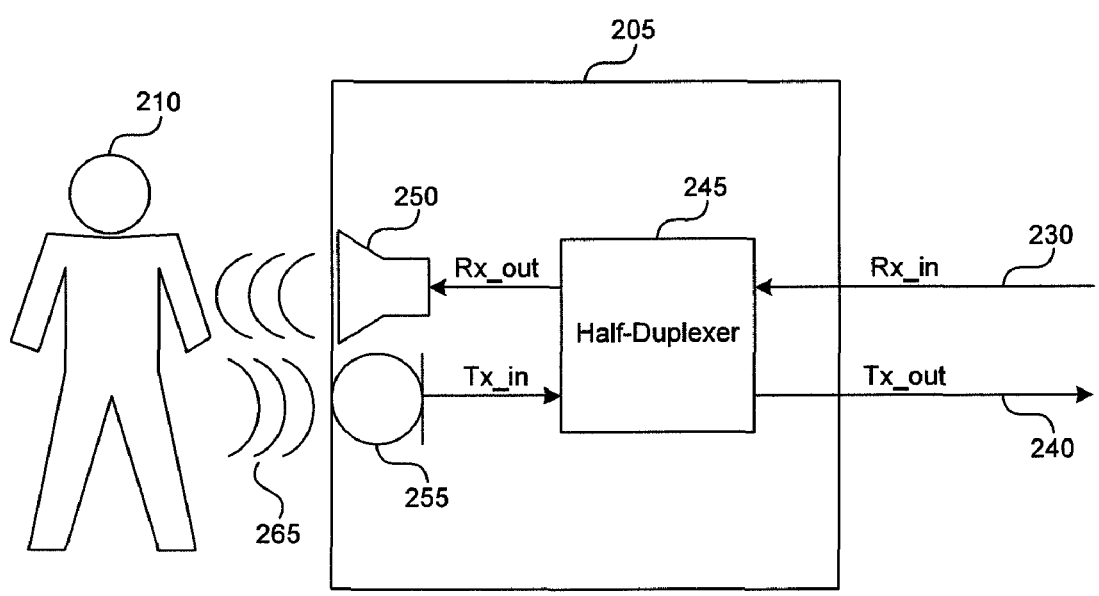
FIG. 2 is a block diagram illustrating a flow of signals through a half-duplexer in a speakerphone.

FIG. 2 is a block diagram illustrating a flow of signals through a half-duplexer 245 in a speakerphone 205 according to aspects of the invention. The half-duplexer 245 receives an electronic signal Tx_in from a microphone 255. This Tx_in signal includes speech or other sounds 265 present in the vicinity of the microphone 255, including speech emanating from a user 210 of the speakerphone 205. The half-duplexer 245 also receives an Rx_in signal from an input connection 230. Based on an analysis of these two input signals, the half-duplexer 245 transmits an output signal Tx_out to an output connection 240 and an output signal Rx_out to a speaker 250.

While FIG. 2 illustrates a suitable environment in which the invention may be practiced, various modifications, such as the inclusion of additional devices, consolidation and/or deletion of various devices, and shifting of functionality from one device to another, may be made without deviating from the invention. As an example, in some embodiments, the Tx_out and Rx_out signals may be processed further before the signals are transmitted to the output connection 240 and speaker 250, respectively. For example, Tx_out may be combined with other signals produced by the speakerphone 205, such as DTMF signals, before this signal is transmitted to the output connection 240.

Figure 3:
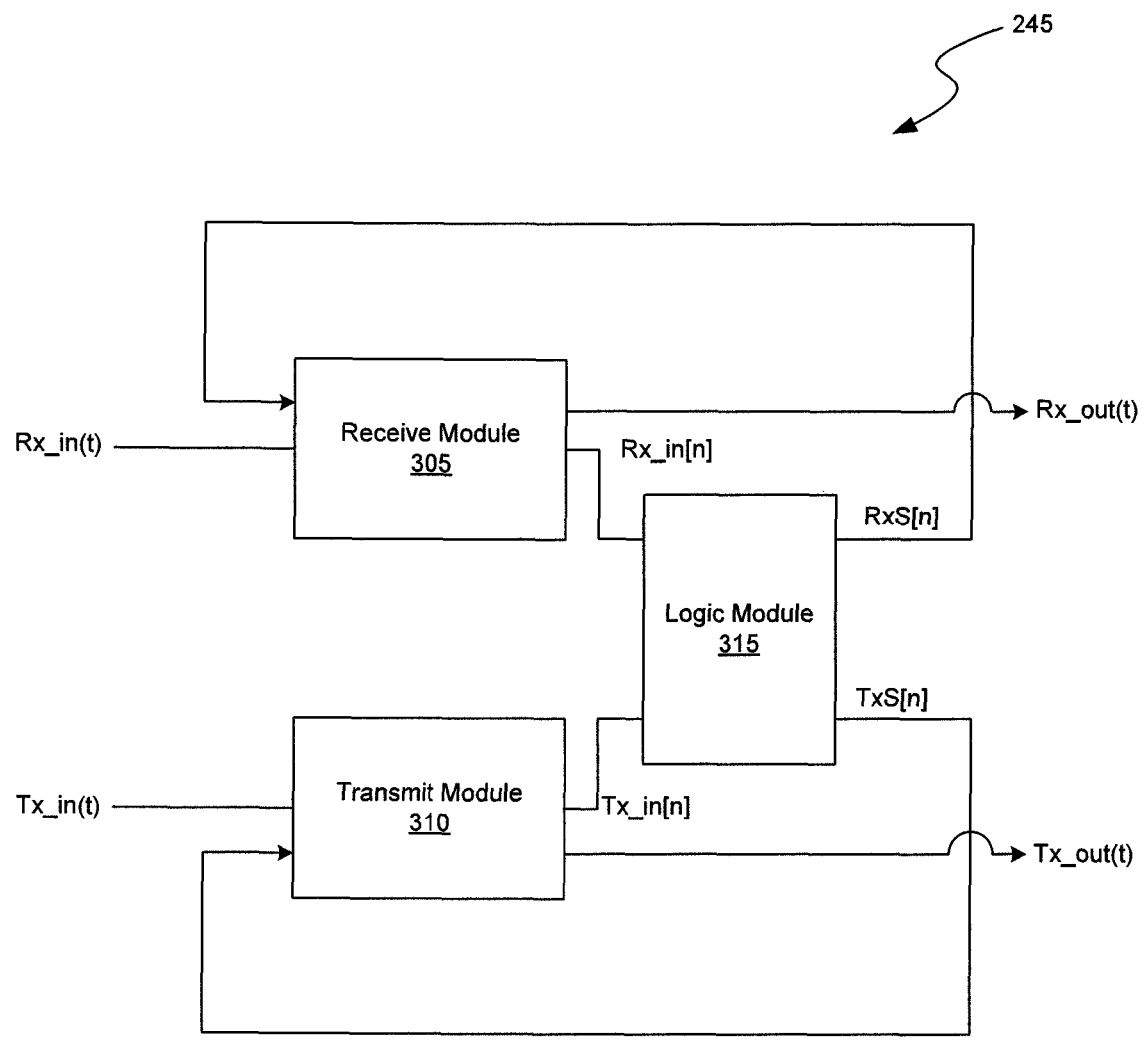
FIG. 3 is a block diagram of a half-duplexer according to aspects of the invention.

FIG. 3 is a block diagram of a half-duplexer 245 according to aspects of the invention. The half-duplexer 245 may be employed as an embodiment of the half-duplexer of FIG. 2. As shown in FIG. 3, the half-duplexer 245 includes a receive module 305, a transmit module 310, and a digital logic module 315. Based on an analysis of the input signals Tx_in(t) and Rx_in(t), the half-duplexer 245 attenuates one or both of these signals to produce output signals Tx_out(t) and Rx_out(t). In this way, the half-duplexer 245 may reduce feedback. The Rx_in(t), Rx_out(t), Tx_in(t) and Tx_out(t) signals are typically analog signals; however, in some embodiments, one or more of these signals may be a digital signal.

The receive module 305 receives two inputs: the Rx_in(t) signal and a control signal RxS[n]. The receive module 305 digitizes Rx_in(t) into a digital signal Rx_in[n] for subsequent analysis by the digital logic module 315. The receive module 305 also attenuates or amplifies the Rx_in(t) signal to generate output signal Rx_out(t). The operational mode of the half-duplexer 245 controls whether the receive module 305 operates as an attenuator or amplifier.

The transmit module 310 receives two inputs: the Tx_in(t) signal from the microphone 255, and a control signal TxS[n]. The transmit module 310 digitizes Tx_in(t) into a digital signal Tx_in[n] for subsequent analysis by the digital logic module 315. The transmit module 310 also attenuates or amplifies the Tx_in(t) signal to create output signal Tx_out(t). The operational mode of the half-duplexer 245 controls whether the transmit module 310 operates as an attenuator or amplifier.

The digital logic module 315 sets the operational mode of the half-duplexer 245. It analyzes the digitized signals Rx_in[n] and Tx_in[n] to determine whether a speakerphone user 210 is speaking, a remote caller is speaking and/or a dial tone is present. Depending on the result of this determination, the digital logic module 315 modifies the operational mode of the speakerphone 205 by modulating the two control signals, RxS[n] and TxS[n]. In some embodiments, the digital logic module may be implemented as digital signal processor (DSP) code to be executed on a DSP.

As will be described in detail later, the digital logic module 315 may utilize various threshold values to make its determinations. Unlike typical analog implementations of half-duplexers, in many embodiments, the threshold values of the digital logic module 315 may be set or adjusted without the use or adjustment of external resistors or other components and without adjusting the connections to external pins. In some embodiments, the digital logic module 315 may be readily calibrated or adjusted to particular operating conditions via adjustments to digital threshold values. Some embodiments may include a serial peripheral interface (SPI) to enable a user or other circuit to set or otherwise adjust digital threshold values. In still other embodiments, the threshold values might be set by a microprocessor and may be stored in volatile or non-volatile random access memory. In some embodiments, the threshold values may be set by the user or other circuit to satisfy certain relationships between reference input signals (not shown) and/or other system parameters.

In some embodiments, receive module 305, transmit module 310 and/or logic module 315 may include additional components. As one example, receive module 305 may also include a power amplifier configured to amplify signal Rx_out before it is transmitted to a speaker. As another example, receive module 305, transmit module 310 and/or logic module 315 may include a volume control module to permit the modulation of the volume of the Rx_out and/or Tx_out signals. As yet another example, receive module 305 and/or transmit module 310 may include optional filters to filter input signals Rx_in(t) and Tx_in(t).

The receive module 305, transmit module 310 and/or digital logic module 315 may also implement other common speakerphone functionality besides half-duplexing. For example, the digital logic module 315 may also implement mute, hold and/or volume control functionalities. In such embodiments, receive module 305, transmit module 310 and/or digital logic module 315 may receive additional input signals and/or provide additional output signals (not shown).

Figure 4:
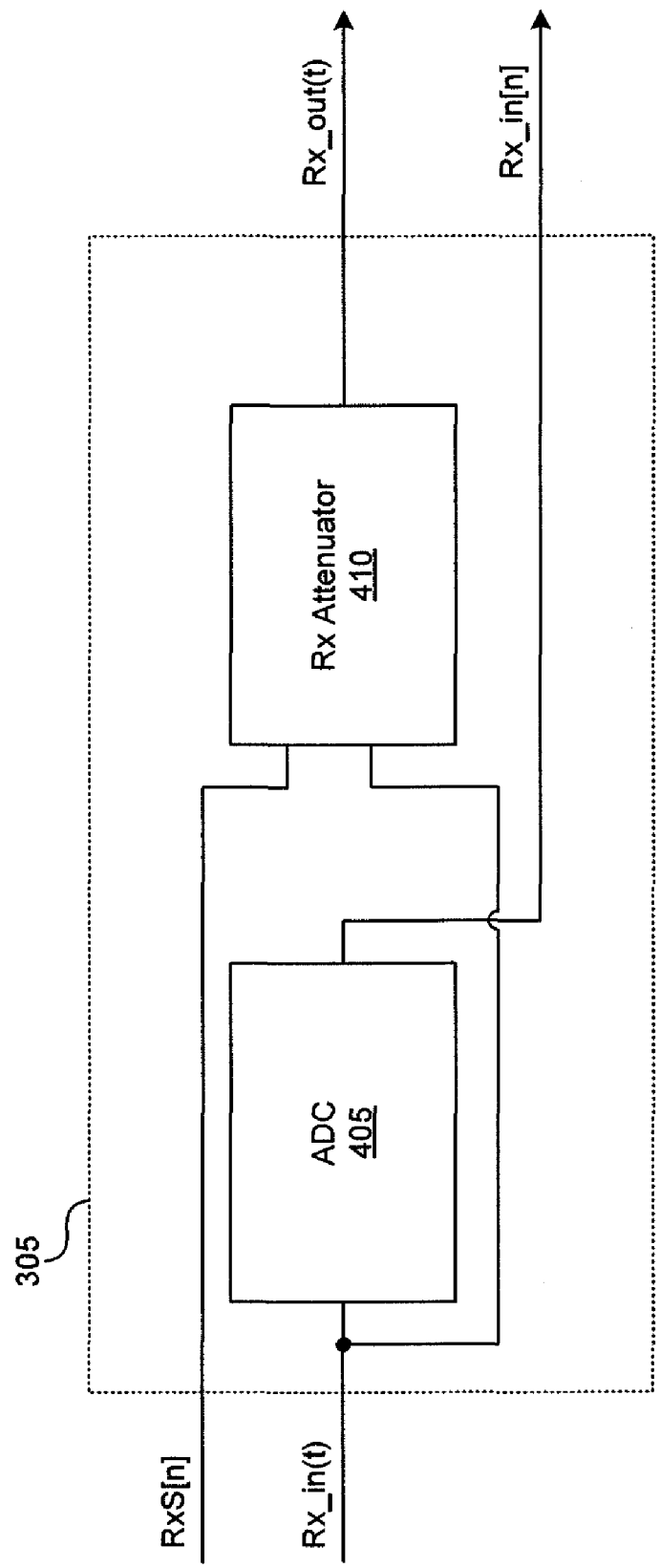
FIG. 4 is a block diagram of a receive module that may be suitably employed in the half-duplexer of FIG. 3.

FIG. 4 is a block diagram of a receive module 305 that may be suitably employed in the half-duplexer 245 of FIG. 3. An analog-to-digital converter (ADC) 405 receives the analog signal Rx_in(t) and produces the digital signal Rx_in[n]. Many types of ADCs are suitable for use as the ADC 405, including successive-approximation ADCs, ramp-compare ADCs, delta-encoded ADCs, pipeline ADCs and Sigma-Delta ADCs. An Rx attenuator 410 receives the analog signal Rx_in(t) and the control signal RxS[n] and produces the output signal Rx_out(t). The Rx attenuator 410 is discussed in further detail with respect to FIG. 5.

Figure 5:
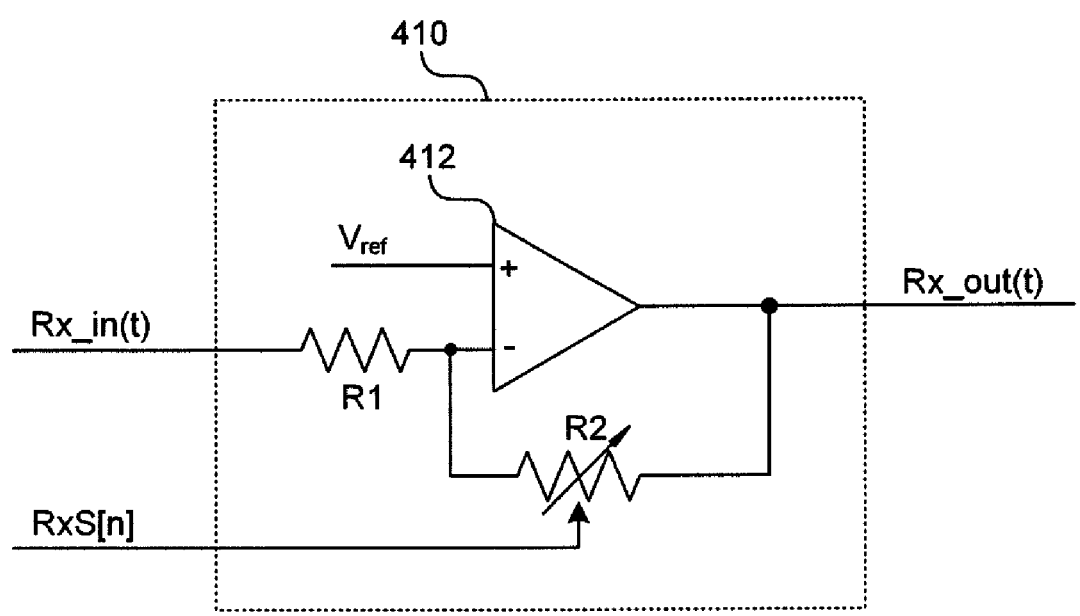
FIG. 5 is a schematic diagram of an Rx attenuator of a receive module that may be suitably employed in the half-duplexer of FIG. 3.

FIG. 5 is a schematic diagram of an Rx attenuator 410 of a receive module 305 that may be suitably employed in the half-duplexer 245. As shown, the Rx attenuator 410 may be a feedback amplifier or any other type of a negative feedback operational amplifier circuit that provides variable amplification of the Rx_in(t) signal. Such feedback amplifier might comprise an operational amplifier 412, a fixed resistive element R1, and a variable resistive element R2, such as a digital potentiometer. In one embodiment, the feedback amplifier has a gain control range from approximately −46 dB to approximately 6 dB in 2 dB steps. A control word is provided via control signal RxS[n] by the digital logic module 315 to modulate this gain. For example, the control word may be a 5-bit control word; however, any suitable length may be employed. Other types of attenuators may also be used as the Rx attenuator 410, including operational amplifiers, power amplifiers, R amplifiers and differential amplifiers.

Figure 6:
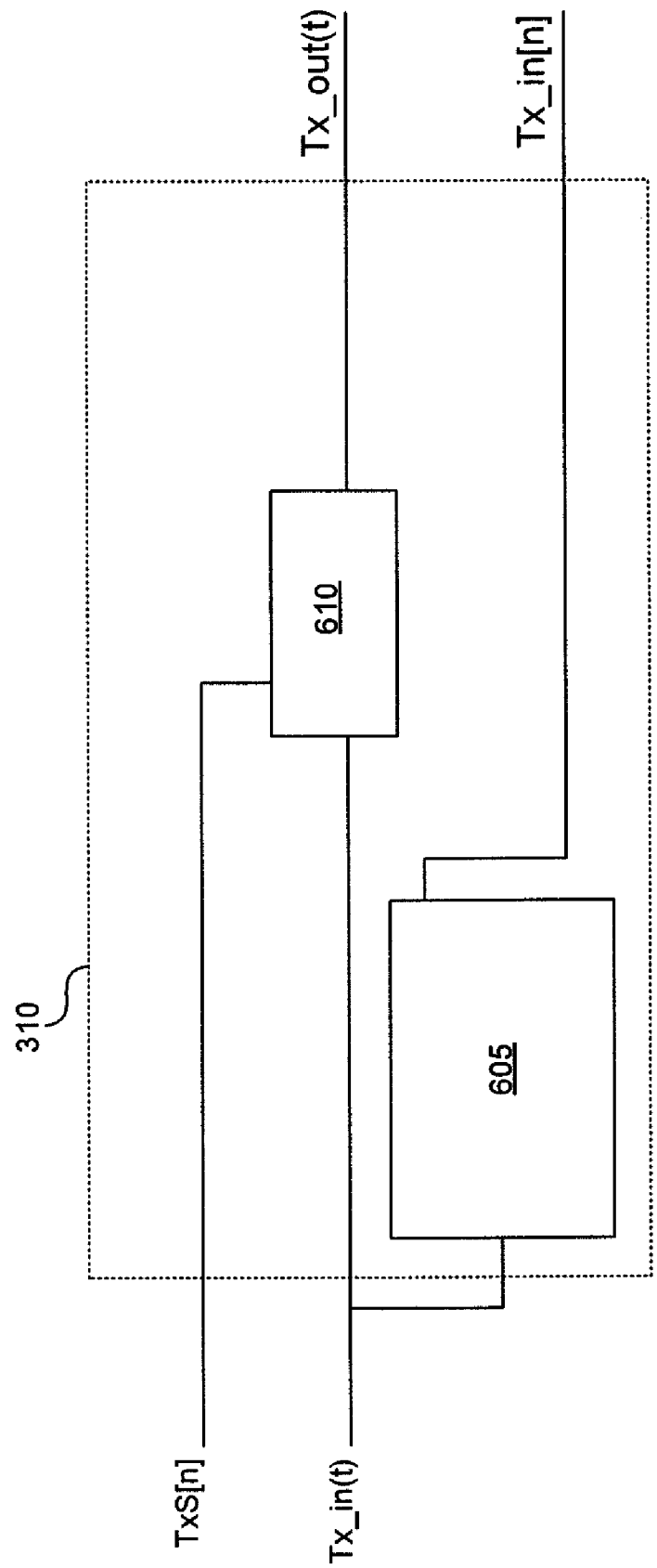
FIG. 6 is a block diagram of a transmit module that may be suitably employed in the half-duplexer of FIG. 3.

FIG. 6 is a block diagram of a transmit module 310 that may be suitably employed in the half-duplexer 245. As shown, an ADC 605 receives the signal Tx_in(t) and produces the output signal Tx_in[n]. Many types of ADCs are suitable for use as the ADC 605, including those described above with reference to FIG. 4. In some embodiments, the Tx_in signal may be a digital signal and the ADC 605 may be omitted. A Tx attenuator 610 is typically implemented as a digital multiplier. In one embodiment, the digital multiplier has a scaling ratio range of 0 to 3.996 in steps of 0.0004. A digital control word "Ka," typically a 20-bit control word, is provided via control signal TxS[n] by the digital logic module 315 to modulate this scaling ratio. Other types of attenuators may be used as the Tx attenuator 610, such as operational amplifiers, power amplifiers, R amplifiers and differential amplifiers.

Referring back to FIG. 3, the digital logic module 315 typically controls the operational mode of the half-duplexer 245 by providing control words via the two control signals RxS[n] and TxS[n] to adjust the gain of the Rx attenuator 410 and the scaling ratio of the Tx attenuator 610, respectively. The digital logic module 315 will set the half-duplexer 245 to one of three possible modes. First, the half-duplexer 245 may operate in an idle mode, where the digital logic module 315 provides control words that cause both the Rx attenuator 410 and Tx attenuator 610 to operate at their minimum gain and minimum scaling ratio, respectively. Second, the half-duplexer 245 may function in receive mode, where the digital logic module 315 provides control words that cause the Tx attenuator 610 to operate at its minimum scaling ratio and the Rx attenuator 410 to operate at its maximum gain. Third, the half-duplexer 245 may operate in a transmit mode, where the digital logic module 310 provides control words that cause the Rx attenuator 410 to function at its minimum gain and the Tx attenuator 610 to function at its maximum scaling ratio.

As an example, to transition the half-duplexer 245 from idle mode to receive mode, the digital logic module 315 provides, over a period of time $T_{tr1}$, a series of control words via RxS[n] that correspond to increasingly larger gains of the Rx attenuator 410, up to the maximum gain of the Rx attenuator 410. When transitioning the half-duplexer 245 from transmit mode to receive mode, the digital logic module 315 will also provide, over approximately the same time period, a series of control words via TxS[n] that correspond to increasingly smaller scaling factors of the Tx attenuator 610, down to the minimum scaling factor of the Tx attenuator 610.

As another example, when transitioning from idle mode to transmit mode, the digital logic module 315 will provide, over a period of time $T_{tr2}$, a series of control words via TxS[n] that correspond to increasingly larger scaling factors of the Tx attenuator 610, up to the maximum scaling factor of the Tx attenuator 610. When transitioning from receive mode to transmit mode, the digital logic module 315 will also provide, over approximately the same time period, a series of control words via RxS[n] that correspond to increasingly smaller gains of the Rx attenuator 410, down to the minimum gain of the Rx attenuator 410.

As another example, when transitioning from receive mode to idle mode, the digital logic module 315 will provide, over a period of time $T_{tr3}$, a series of control words via RxS[n] that correspond to increasingly smaller gains of the Rx attenuator 410, down to the minimum gain of the Rx attenuator 410. When transitioning from transmit mode to idle mode, the digital logic module will provide, over approximately the same time, a series of control words via TxS[n] that correspond to increasingly smaller scaling factors of the Tx attenuator 610, down to the minimum scaling factor of the Tx attenuator 610.

In one embodiment, $T_{tr1}$, $T_{tr2}$, and $T_{tr3}$ are chosen to be identical, programmable, and to have a nominal value of 26 ms, with a maximum of 30 ms and a control resolution of 260 μs. In other embodiments, these times may be nonidentical, fixed, and/or may have different nominal values and programmable ranges.

Figure 7:
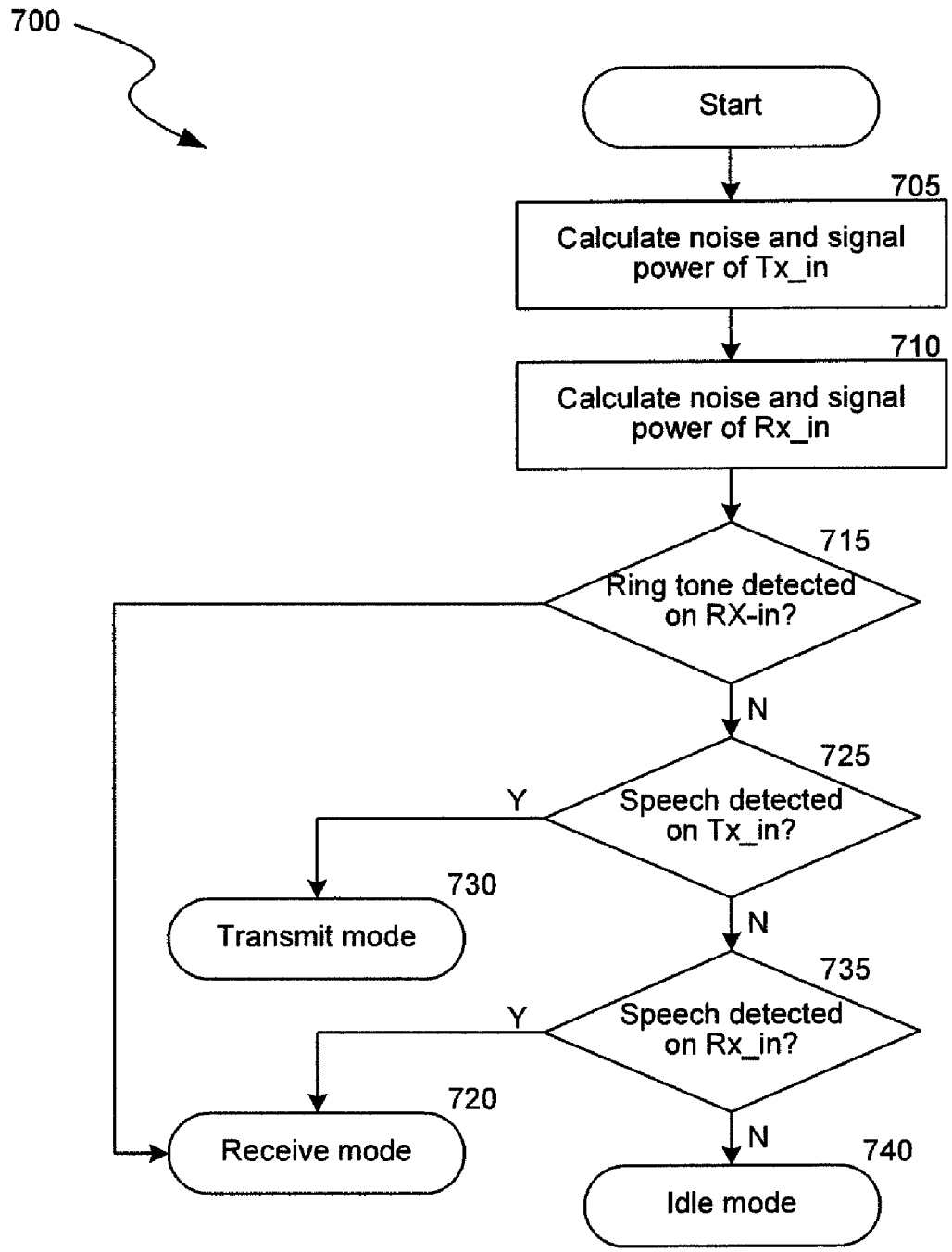
FIG. 7 is a flowchart of a process that may be suitably employed to set the operational mode of the half-duplexer of FIG. 3.

FIG. 7 is a flowchart of a process 700 that may be suitably employed to set the operational mode of the half-duplexer 245 of FIG. 3. At the start of the process 700, the digital logic module 315 calculates the noise and signal power of Tx_in at block 705, and then the noise and signal power of Rx_in at block 710.

Next, at decision block 715, using these noise and power calculations, the digital logic module 315 determines whether a ringtone is detected on Rx_in. If a ringtone is detected, the digital logic module 315 switches the half-duplexer 245 to receive mode at block 720, or if the half-duplexer 245 is already in receive mode, it maintains the system in that mode.

If no ringtone is detected on Rx_in, the digital logic module 315 determines at decision block 725 if speech or other sound is detected on Tx_in. If speech or another sound is detected on Tx_in, the digital logic module 315 switches the half-duplexer 245 to transmit mode at block 730, or if the half-duplexer 245 is already in transmit mode, it maintains the system in that mode.

If no speech or other sound is detected on Tx_in, the digital logic module 315 determines at decision block 735 if speech or another sound is detected on Rx_in. If speech is detected on Rx_in, the digital logic module 315 switches the half-duplexer 245 to receive mode at block 720, or if the half-duplexer 245 is already in receive mode, it maintains the system in that mode.

Otherwise, the digital logic module 315 switches the half-duplexer 245 to idle mode at block 740, or if the half-duplexer 245 is already in idle mode, it maintains that mode.

Figure 8:
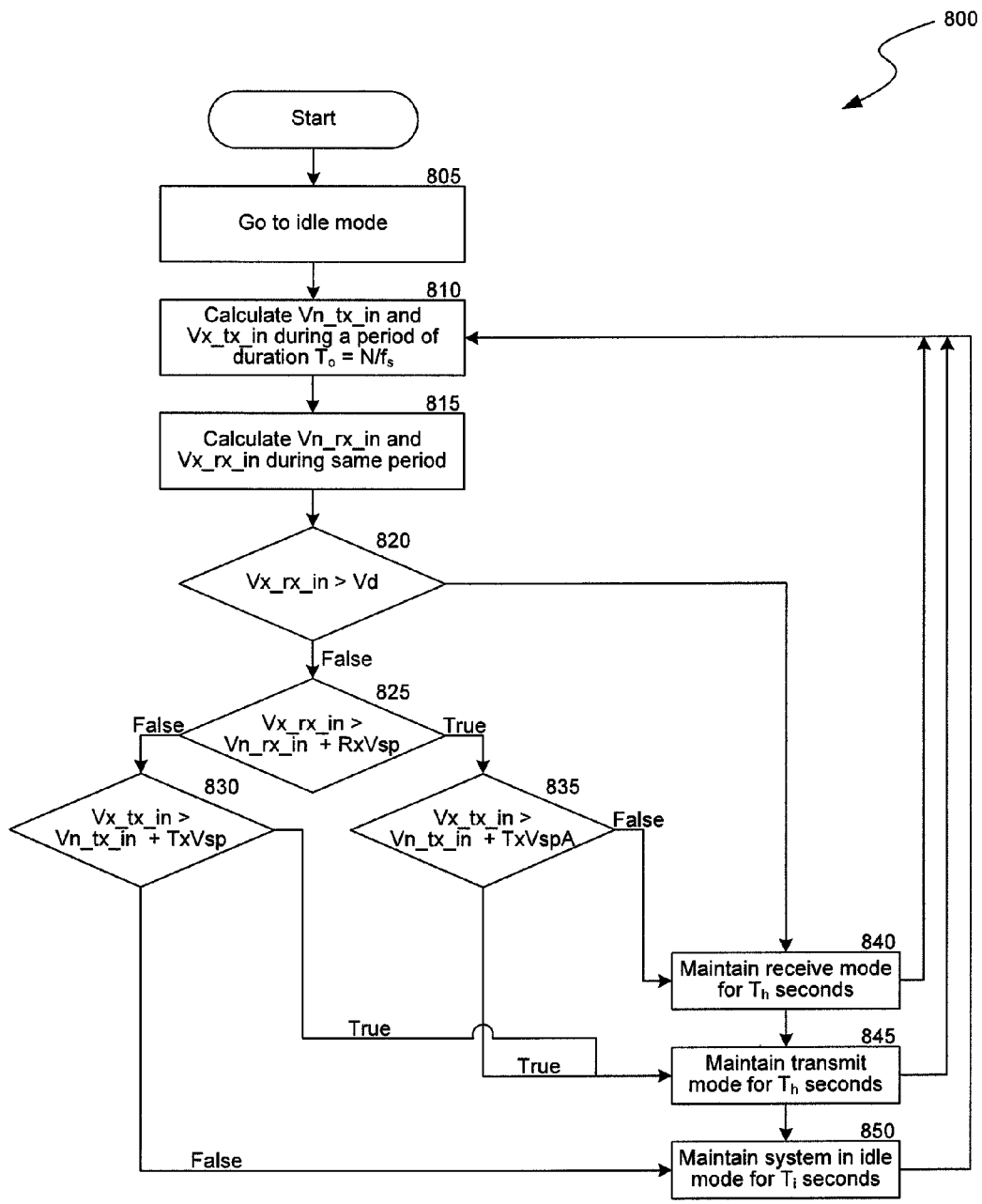
FIG. 8 is a flowchart of a process of specific calculations and state transitions, which may be implemented by a digital logic module, that may be suitably employed in the half-duplexer of FIG. 3.

FIG. 8 is a flowchart of a process 800 of specific calculations and state machine transitions that may be made by the digital logic module 315 in order to implement process 700. To implement the steps of process 800, the digital logic module 315 may utilize programmable variables and calculated variables. The programmable variables might be set by a microprocessor and may be stored in volatile or non-volatile random access memory. In some embodiments, the programmable variables may be modifiable by a user or may be fixed.

Table 1 illustrates the programmable variables referred to by FIG. 8 and provides typical values for these programmable variables. Some embodiments may also include a serial peripheral interface to permit a user to set or adjust these variables.

TABLE 1

Programmable variables of the digital logic module 315.

| Variable | Description | Typical Values |
|---|---|---|
| $V_d$ | Dial tone detection threshold. | 25 mV. |
| N | Total number of samples collected during a period. | 2000 |
| Nx | Number of samples used to calculate signal power of a signal during a period. | 128 or 100 |
| Nn | Number of samples used to calculate background noise of a signal during a period. | 128 or 100 |
| RxVsp | Speech or sound detection threshold for Rx. | 12 dB |
| TxVsp | Speech or sound detection threshold for Tx, when no speech or sound is detected on Rx. | 12 dB |
| TxVspA | Speech or sound detection threshold for Tx, when speech or sound is detected on Rx (i.e., under a double-talk condition). | Set equal to RxVsp or 5 dB |
| $T_h$ | Receive or transmit mode hold time. | 3 mS |
| $T_i$ | Idle mode hold time. | 3 mS |

In some embodiments, the TxVspA threshold may be further calibrated via a calibration module. The calibration module may adjust this threshold to compensate for echoes or other feedback that may be received by the speakerphone due to other devices sharing the same input line. For example, the calibration module may adjust the TxVspA threshold to correct for echoes caused by an asymmetrical digital subscriber line (ADSL) modem or similar device that is incorporated onto the same telephone line as the speakerphone. To do so, while the speakerphone is not being used for a call, the calibration module may send an approximately 1-kilohertz (kHz) test signal on the output connection and measure the strength of any echo signal that is subsequently received on the input connection. Based on the echo that is received, the calibration module may adjust the TxVspA variable. In other embodiments, suitable frequencies other than 1 kHz may be used.

Table 2 describes the calculated variables referred to by FIG. 8, including the calculation made for each variable.

TABLE 2

Calculated variables of the digital logic module 315.

| Variable | Description | Calculation |
|---|---|---|
| Vx_tx_in | Signal power level of Tx_in. | Mean of the Nx samples of Tx_in with the highest power. |
| Vn_tx_in | Background noise level Tx_in. | Mean of the Nn samples of Tx_in with the lowest power. |
| Vx_rx_in | Signal power level of Rx_in. | Mean of the Nx samples of Rx_in with the highest power. |
| Vn_rx_in | Background noise level Rx_in. | Mean of the Nn samples of Rx_in with the lowest power. |

As shown in block 805, the digital logic module 315 initializes the half-duplexer 245 system in idle mode. At block 810, the digital logic module 315 calculates Vn_tx_in and Vx_tx_in, during a period of duration $T_o=N/f_s$, where $f_s$ is the sampling frequency of the half-duplexer 245. As shown above in Table 2, these calculated values may correspond to the background noise and signal power of Tx_in, respectively. At block 815, the digital logic module 315 calculates Vn_rx_in and Vx_rx_in during substantially the same period. As shown above in Table 2, these calculated values may correspond to the background noise and signal power of Rx_in, respectively.

At decision block 820, using these results, the digital logic module 315 determines if a dial tone is present on the Rx_in signal based on evaluation of the logic statement Vx_rx_in>$V_d$, where $V_d$ is the programmable threshold variable. If a dial tone is detected, at block 840 the digital logic module 315 maintains the half-duplexer 245 in receive mode for $T_h$ seconds.

If no dial tone is detected, the digital logic module 315 determines at decision block 825 if a non-noise signal is present on Rx_in, by evaluating the logic statement Vx_rx_in>Vn_rx_in+RxVsp, where RxVsp is the speech or sound detection threshold for Rx_in.

If speech or sound is detected on Rx_in, the digital logic module 315 then determines at decision block 835 if speech or sound on Tx_in exceeds a "double-talk" threshold by evaluating the logic statement Vx_tx_in>Vn_tx_in+TxVspA, where TxVspA is the programmable "double-talk" threshold variable. In the event that speech or sound is detected on both Rx_in and Tx_in, at block 845 the digital logic module 315 switches the half-duplexer 245 to transmit mode for $T_h$ seconds. Otherwise, in the event that speech or sound was only detected on Rx_in and not on Tx_in, at block 840 the digital logic module 315 switches the half-duplexer 245 to receive mode for a period of $T_h$ seconds.

If speech or sound is not detected on Rx_in, the digital logic module 315 determines at decision block 830 if speech or sound on Tx_in exceeds another different threshold by evaluating the logic statement Vx_tx_in>Vn_tx_in+TxVsp, where TxVsp is the programmable threshold variable that is used when no speech or sound is detected on Rx_in. In the event that speech or sound is detected on only Tx_in, at block 845 the digital logic module 315 switches the half-duplexer 245 to transmit mode for $T_h$ seconds.

Otherwise, in the event that speech or sound was not detected on either Rx_in or Tx_in, the digital logic module 315 switches the half-duplexer 245 to idle mode for $T_i$ seconds, as shown at block 850. This process 800 may be repeated indefinitely or for a finite period during the operation of the speakerphone 205, starting at block 810.

Processes 700 and 800 may be implemented in software, hardware, or a combination of hardware and software. As such, the operations illustrated as blocks in FIG. 7 and FIG. 8 may represent computer-executable instructions that, when executed, establish the operational mode of the half-duplexer 245. For example, in some embodiments, one or both of these processes or similar processes may be implemented within DSP code to be executed on a DSP. For clarity, processes 700 and 800 were described previously as being performed by the particular elements of the half-duplexer 245 of FIG. 2. However, processes 700 and 800 may also be performed by other elements, or in other systems, whether or not such elements or systems are described herein.

Those skilled in the art will appreciate that the blocks shown in FIG. 7 and FIG. 8 may be altered in a variety of ways. For example, the order of blocks may be rearranged, sub-steps may be performed in parallel, shown blocks may be omitted, or other blocks may be included, etc. For example, two or more of the decisions made at blocks 825, 830 and 835 may be implemented concurrently and/or may be implemented in part using one or more exclusive-OR (XOR) gates.

Various methods for implementing the described calculations and logic evaluation are well-known in the art. In some embodiments, the digital logic module 315 may be implemented using CMOS logic, application specific integrated circuits (ASICs), field-programmable gate arrays (FPGA), programmable logic devices (PLD), or discrete logic.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. An apparatus for use with a two-way communication device, comprising:
   a half-duplexer comprising:
      a receive attenuator configured to provide a first output signal by scaling a first input signal received from a first input;
      a transmit attenuator configured to provide a second output signal by scaling a second input signal received from a second input; and
      a digital logic module configured to provide a first control signal to the receive attenuator to control a manner in which the receive attenuator scales the first input signal, and configured to provide a second control signal to the transmit attenuator to control a manner in which the transmit attenuator scales the second input signal; and
   a calibration module configured to send a test signal on an output connection, to measure an echo signal received on an input connection in response to the test signal, and to adjust a threshold value based on the measured echo signal.

2. The apparatus of claim 1, wherein the receive attenuator comprises a negative feedback operational amplifier circuit.

3. The apparatus of claim 1, wherein the transmit attenuator comprises a digital multiplier.

4. The apparatus of claim 1, wherein the digital logic module is implemented as digital signal processor (DSP) code to be executed on a DSP.

5. The apparatus of claim 1, wherein the half-duplexer further comprises:
a first analog-to-digital converter configured to convert the first input signal into a first digital input signal; and
a second analog-to-digital converter configured to convert the second input signal into a second digital input signal, wherein the digital logic module is further configured to receive the first and second digital input signals and to estimate the noise and signal power of the first and second input signals during a period using the first and second digital input signals.

6. The apparatus of claim 1, wherein the digital logic module is further configured to estimate the noise and signal power of the first and second input signals during a period.

7. The apparatus of claim 6, wherein the digital logic module is further configured to:
estimate the noise of the first input signal during a period by averaging a first set of Nn samples of the first input signal, wherein Nn is an integer and the first set of Nn samples includes those samples having the lowest values of the first input signal during the period;
estimate the signal power of the first input signal during a period by averaging a first set of Nx samples of the first input signal, wherein Nx is an integer and the first set of Nx samples includes those samples having the highest values of the first input signal during the period;
estimate the noise of the second input signal during a period by averaging a second set of Nn samples of the second input signal, wherein the second set of Nn samples includes those samples having the lowest values of the second input signal during the period; and
estimate the signal power of the second input signal during a period by averaging a second set of Nx samples of the second input signal, wherein the second set of Nx samples includes those samples having the highest values of the second input signal during the period.

8. The apparatus of claim 1, wherein the digital logic module is further configured to:
estimate the noise and signal power of the first and second input signals; and
regulate the first and second control signals based on at least one of the following determinations:
whether the estimated signal power of the first input signal exceeds the estimated noise of the first input signal plus a first threshold value; and
whether the estimated signal power of the second input signal exceeds the estimated noise of the second input signal plus a second threshold value.

9. The apparatus of claim 8, further comprising:
an exclusive-OR (XOR) gate configured to regulate the first and second control signals.

10. The apparatus of claim 8, further comprising:
a serial peripheral interface configured to enable programming of the first and second threshold values.

11. The apparatus of claim 8, wherein the calibration module is configured to send a test signal having a frequency of approximately 1 kilohertz and to adjust at least one of the first and second threshold values based on the measured echo signal.

12. The apparatus of claim 1, wherein the digital logic module is further configured to estimate the noise and signal power of the first and second input signals, and to regulate the first and second control signals based on whether the estimated signal power of at least one of the first and second input signals exceeds a threshold value.

13. The apparatus of claim 1, wherein the first and second input signals are both analog signals and the digital logic module is configured to provide at least one of a first control signal to the receive attenuator to attenuate the first input signal and a second control signal to the transmit attenuator to attenuate the second input signal.

14. A non-transitory processor readable medium comprising instructions that when executed on a processor perform a method for providing half-duplex functionality in a two-way communication device, wherein the method comprises:
estimating the signal power and background noise of a first input signal during a period;
estimating the signal power and background noise of a second input signal during approximately the same period;
providing at least one control signal based on the result of at least one of the following determinations:
whether the estimated signal power of at least one of the first and second input signals exceeds a threshold value;
whether the estimated signal power of the first input signals exceeds the sum of a first threshold value and the estimated background noise of the first input signal; and
whether the estimated signal power of the second input signal exceeds the sum of a second threshold value and the estimated background noise of the second input signal,
and wherein the steps of estimating signal power and background noise and providing at least one control signal based on the result of at least one determination are performed by a digital signal processor.

15. The non-transitory processor readable medium of claim 14, wherein the method further comprises the steps of:
converting the first input signal from an analog signal to a digital signal; and
converting the second input signal from an analog signal to a digital signal; and
attenuating at least one input signal based upon the at least one control signal provided.

16. The non-transitory processor readable medium of claim 14, wherein:
estimating the background noise of the first input signal during a period comprises averaging a first set of Nn samples of the first input signal, wherein Nn is an integer and the first set of Nn samples includes those samples having the lowest values of the first input signal during the period;
estimating the signal power of the first input signal during a period comprises averaging a first set of Nx samples of the first input signal, wherein Nx is an integer and the first set of Nx samples includes those samples having the highest values of the first input signal during the period;
estimating the background noise of the second input signal during a period comprises averaging a second set of Nn samples of the second input signal, wherein the second set of Nn samples includes those samples having the lowest values of the second input signal during the period; and
estimating the signal power of the second input signal during a period comprises averaging a second set of Nx samples of the second input signal, wherein the second set of Nx samples includes those samples having the highest values of the second input signal during the period.

17. The non-transitory processor readable medium of claim 14, wherein the method further comprises the steps of:
sending a test signal on an output connection;
measuring an echo signal received on an input connection in response to the test signal; and
adjusting at least one of the first and second threshold values based on the measured echo signal.

18. An apparatus for use with a two-way communication device, comprising:
means for estimating the signal power and background noise of a first input signal during a period;
means for estimating the signal power and background noise of a second input signal during approximately the same period;
means for providing at least one control signal based on the result of at least one of the following determinations:
whether the estimated signal power of at least one of the first and second input signals exceeds a threshold value;
whether the estimated signal power of the first input signal exceeds the sum of a first threshold value and the estimated background noise of the first input signal; and
whether the estimated signal power of the second input signal exceeds the sum of a second threshold value and the estimated background noise of the second input signal.

19. The apparatus of claim 18, wherein:
the means for estimating the background noise of the first input signal during a period comprises means for averaging a first set of Nn samples of the first input signal, wherein Nn is an integer and the first set of Nn samples includes those samples having the lowest values of the first input signal during the period;
the means for estimating the signal power of the first input signal during a period comprises means for averaging a first set of Nx samples of the first input signal, wherein Nx is an integer and the first set of Nx samples includes those samples having the highest values of the first input signal during the period;
the means for estimating the background noise of the second input signal during a period comprises means for averaging a second set of Nn samples of the second input signal, wherein the second set of Nn samples includes those samples having the lowest values of the second input signal during the period; and
the means for estimating the signal power of the second input signal during a period comprises means for averaging a second set of Nx samples of the second input signal, wherein the second set of Nx samples includes those samples having the highest values of the second input signal during the period.

20. The apparatus of claim 18, further comprising
means for sending a test signal having a frequency of approximately 1 kilohertz on an output connection;
means for measuring an echo signal received in response to the test signal; and
means for adjusting at least one of the first and second threshold values based on the measured echo signal.

* * * * *